US009427746B2

(12) United States Patent
Au et al.

(10) Patent No.: US 9,427,746 B2
(45) Date of Patent: Aug. 30, 2016

(54) AIRCRAFT ELECTROSTATIC PARTICLE SEPARATION CONTROL SYSTEM

(71) Applicant: HONEYWELL INTERNATIONAL INC., Morristown, NJ (US)

(72) Inventors: Henry Au, West Covina, CA (US); Hal J. Strumpf, Rancho Palos Verdes, CA (US); Dennis M. Morita, Rancho Palos Verdes, CA (US); Daniel R. Robles, Long Beach, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 144 days.

(21) Appl. No.: 14/042,926

(22) Filed: Oct. 1, 2013

(65) Prior Publication Data

US 2015/0090114 A1 Apr. 2, 2015

(51) Int. Cl.

| | |
|---|---|
| ***B01D 46/46*** | (2006.01) |
| ***B01D 53/30*** | (2006.01) |
| ***B03C 3/34*** | (2006.01) |
| ***B03C 3/68*** | (2006.01) |
| ***B03C 9/00*** | (2006.01) |

(52) U.S. Cl.
CPC . *B03C 3/34* (2013.01); *B03C 3/68* (2013.01); *B03C 9/00* (2013.01); *B03C 2201/24* (2013.01)

(58) Field of Classification Search
CPC ............. B03C 3/38; B03C 3/41; B03C 3/45; B03C 3/16; B03C 3/00; B03C 3/017; B03C 3/12; B03C 3/15; B03C 3/14; B03C 3/145; B03C 3/155; B01D 46/032
See application file for complete search history.

(56) References Cited

U.S. PATENT DOCUMENTS

| | | | | |
|---|---|---|---|---|
| 2,360,595 | A * | 10/1944 | Thompson | 96/61 |
| 3,440,800 | A * | 4/1969 | Messen-Jaschin | 96/52 |
| 3,526,081 | A * | 9/1970 | Kusters | 96/61 |
| 3,668,835 | A * | 6/1972 | Vicard | 96/27 |
| 4,029,485 | A * | 6/1977 | Siwersson et al. | 96/39 |
| 5,690,720 | A * | 11/1997 | Spero | 96/26 |
| 5,954,933 | A * | 9/1999 | Ingalls et al. | 204/557 |

(Continued)

FOREIGN PATENT DOCUMENTS

| | | | |
|---|---|---|---|
| EP | 1867346 A1 | | 12/2007 |
| WO | WO2012139642 | * | 10/2012 |

OTHER PUBLICATIONS

Viner et al, Ozone Generation in dc-Energized Electrostatic Precipitators, Jun. 1992, IEEE Transactions On Industry Applications, p. 504.*

(Continued)

*Primary Examiner* — Amber R Orlando
(74) *Attorney, Agent, or Firm* — Shimokaji IP

(57) ABSTRACT

An Environmental Control System may use an electronic particle separation system to control humidity in an aircraft. The electronic particle separation system may include a particle separator, a sensor module, and a controller configured to receive signals from the sensor module, and operate the particle separator based on the received sensor signals. In some embodiments, the controller may include a processor which may determine whether the particle separator is being operated under an ozone related condition exceeding a threshold operating condition. If one of the threshold operating conditions is exceeded, the particle separator may be turned off which may control the amount of ozone present in the aircraft.

6 Claims, 5 Drawing Sheets

(56) References Cited

U.S. PATENT DOCUMENTS

| | | | |
|---|---|---|---|
| 6,295,822 B1 | 10/2001 | Mueller | |
| 6,582,500 B1 | 6/2003 | Ohadi et al. | |
| 6,888,721 B1 | 5/2005 | Moghaddam et al. | |
| 7,108,056 B1 | 9/2006 | Moghaddam et al. | |
| 7,159,646 B2 | 1/2007 | Dessiatoun et al. | |
| 7,381,246 B1 | 6/2008 | Zhao et al. | |
| 7,524,357 B2 * | 4/2009 | Daukant | 95/69 |
| 8,460,433 B2 | 6/2013 | Gefter et al. | |
| 2009/0114218 A1 * | 5/2009 | Veatch | 128/202.25 |
| 2012/0167558 A1 * | 7/2012 | Svihla et al. | 60/323 |

OTHER PUBLICATIONS

Hamon Research-Cottrell, Inc., Electrostatic Precipitator Ozone Safety, Jul. 24, 2013.

* cited by examiner

| | | Standard Atmosphere | | | Location A | | | | | Location B | | | | | Location C | | | | |
|---|---|---|---|---|---|---|---|---|---|---|---|---|---|---|---|---|---|---|---|
| Altitude | Saturation Humidity | Device Status | Temp | Typical Water Content | Device Status | Temp | Max Water Content | Temp | Min Water Content | Device Status | Temp | Max Water Content | Temp | Min Water Content | Device Status | Temp | Max Water Content | Temp | Min Water Content |
| ft | gr/lb | | °F | gr/lb | | °F | gr/lb | °F | gr/lb | | °F | gr/lb | °F | gr/lb | | °F | gr/lb | °F | gr/lb |
| -3989 | 23 | ON | | | ON | | | | | ON | 71 | 82 | 30 | 5 | ON | | | | |
| -16 | 27 | | | | | 87 | 163 | 45 | 9 | | | | | | | | | | |
| 0 | 26 | | 59 | 44 | | | | | | | | | | | | | | | |
| 371 | 27 | | | | | | | | | | | | | | | 87 | 107 | 40 | 9 |
| 3300 | 30 | | | | | 76 | 135 | 42.8 | 3 | | | | | | | 76 | 100 | 30 | 4 |
| 6600 | 34 | OFF | 35.6 | 27 | | 64 | 98 | 32 | 2 | | 66 | 99 | 23 | 6 | | 69 | 75 | 19 | 3 |
| 9800 | 42 | | | | | 54 | 77 | 12.2 | 1 | | 55 | 73 | 10 | 5 | | 52 | 62 | 9 | 2 |
| 13100 | 49 | | 12.2 | 13 | | 42 | 58 | 6.8 | 1 | | 46 | 63 | -4 | 4 | OFF | 41 | 46 | -3 | 1 |
| 16400 | 57 | | | | OFF | 31 | 47 | | | OFF | 36 | 50 | -15 | 2 | | 30 | 37 | -17 | 1 |
| 19700 | 62 | | -11.2 | 6 | | 20 | 35 | | | | 28 | 40 | -33 | 1 | | 17 | 26 | -31 | 0 |
| 23000 | 74 | | | | | 9 | 26 | | | | 14 | 30 | -44 | 1 | | 10 | 21 | -39 | 0 |
| 26200 | 85 | | -34.6 | 2 | | -4 | 16 | | | | 3 | 20 | -56 | | | -4 | 10 | | |
| 29500 | 100 | | | | | -17 | 11 | | | | -9 | 11 | -67 | | | -19 | 7 | | |

FIG. 5

AIRCRAFT ELECTROSTATIC PARTICLE SEPARATION CONTROL SYSTEM

BACKGROUND OF THE INVENTION

The present invention generally relates to apparatus and methods for treatment of airstreams in an Environmental Control System (ECS) to remove particles using an aircraft electrostatic particle separation control system.

ECS of various types and complexity are used in military and civil airplane, helicopter, and spacecraft applications. In aircraft for example, airflow may be circulated to occupied compartments, cargo compartments, and electronic equipment bays. Humid air containing many pollutants such as particulate matter, aerosols, and hydrocarbons may be delivered in a heated condition to the ECS. As the humid air cools, aqueous vapor condenses into liquid. The entrained moisture may be uncomfortable for passengers, unacceptable for air-cooled electronic equipment, may cause windshield fogging, and may cause corrosion to exposed metals. The ECS may include provisions to dehumidify the air supply during cooling operations to provide a comfortable environment for the passengers and crew, where particle separation may be an important function.

One approach to controlling humidity uses electrostatic particle separators. An electrostatic particle separator may extract particles, for example, liquid water from air. Typically, an electrostatic particle separator relies on a high-voltage source to create an electrostatic force around the emitter electrode strong enough to migrate particles away from the electrode and toward the outer walls of the separator. However, when the electric field intensity exceeds the maximum limit that the gas (air) can sustain, a corona discharge will form. The corona discharge may cause a split in the oxygen ($O_2$) molecules. The resulting oxygen atoms (O—), seeking stability, may attach to other oxygen ($O_2$) molecules forming ozone ($O_3$). Ozone is also already normally present in higher concentrations at higher altitude of the Earth's atmosphere. The ozone levels in aircraft cabins have to be controlled under requirements of the Federal Aircraft Regulations (FAR). In some ECSs an ozone-destroying catalytic converter may be used to reduce the ozone levels. However, the converter is typically upstream of the separator and thus ozone produced by the separator may be unaffected.

As can be seen, it may be desirable to control the electrostatic particle separator to generate the least amount of ozone.

SUMMARY OF THE INVENTION

In one aspect of the present invention, an electrostatic particle separation control system in an Environmental Control System (ECS) comprises a sensor module; a particle separator coupled to the sensor module; and a controller configured to: receive signals from the sensor module, and operate the particle separator based on the received sensor signals.

In another aspect of the present invention, a controller in an electrostatic particle separation control system is comprises a memory module including stored non-transitory computer instructions; and a processor configured to: operate a particle separator in the ECS; check the memory module for stored threshold operating conditions corresponding to the particle separator determine whether the particle separator is being operated under an ozone related condition exceeding one of the threshold operating conditions and turn off the particle separator in response to the determination indicating the particle separator is operating under the ozone related condition.

In yet another aspect of the present invention, a method of controlling ozone in an environment comprises operating a particle separator; removing liquid particles from air in the environment using the particle separator; checking a parameter of the environment; and turning off the particle separator in response to the parameter exceeding a threshold value, whereby ozone production from the particle separator ceases upon turning off the particle separator.

These and other features, aspects and advantages of the present invention will become better understood with reference to the following drawings, description and claims.

BRIEF DESCRIPTION OF THE DRAWINGS

FIG. 5 is a table of exemplary altitude versus saturation humidity values for use with exemplary embodiments of the present invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

The present invention generally provides a method for controlling a substantially high voltage source to the electrodes of a particle separator that may be, for example, in an environment such as an aircraft. As described in more detail below, an operational scheme may minimize power consumption in the aircraft and may minimize a time-weighted average production of the amount of ozone present in the aircraft. In general, the operational scheme may use environmental measurements to determine when power to the particle separator should be turned off. Some conditions, for example, at high altitudes, relative humidity and ambient pressure may be lower. Also, higher ozone content in the atmosphere may already be present. Thus, it may be beneficial to turn off the particle separator where less humidity is present to save power. In addition, by turning off the particle separator, ozone is not being produced by the particle separator and thus the particle separator may not contribute additional ozone to the ozone content already present in the aircraft environment.

Figure 1:
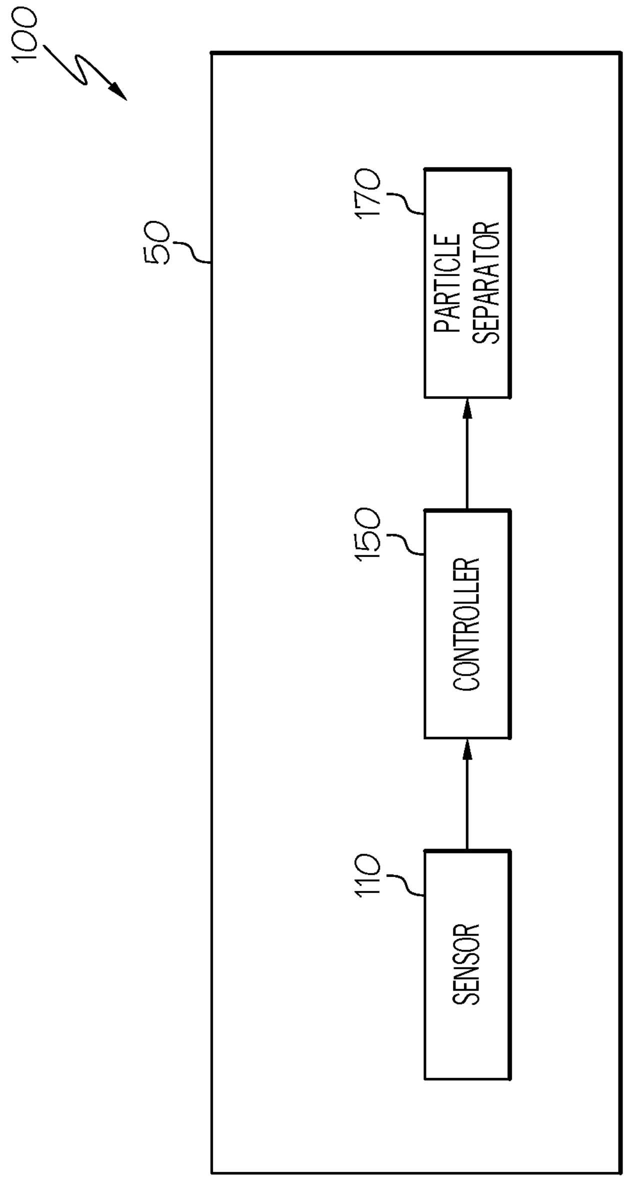
FIG. 1 is a block diagram of an ECS according to an exemplary embodiment of the present invention.

Referring now to FIG. 1, an Environmental Control System (ECS) 50 is shown having an electrostatic particle separation control system 100 according to an exemplary embodiment of the present invention. The electrostatic particle separation control system 100 generally includes a sensor module 110, a controller 150, and a particle separator 170. The sensor module 110 may provide internal system sensor measurements to the controller 150; receive, in various embodiments, external flight data pertinent to the operation of the controller 150. The controller 150 may control operation of the particle separator based on comparing the measurements from the sensor module 110 to stored threshold values. In some embodiments, the particle separator 170 may be configured to separate liquid from an airstream. Additional details of the electrostatic particle separation control system 100 are described in the following.

Figure 2:
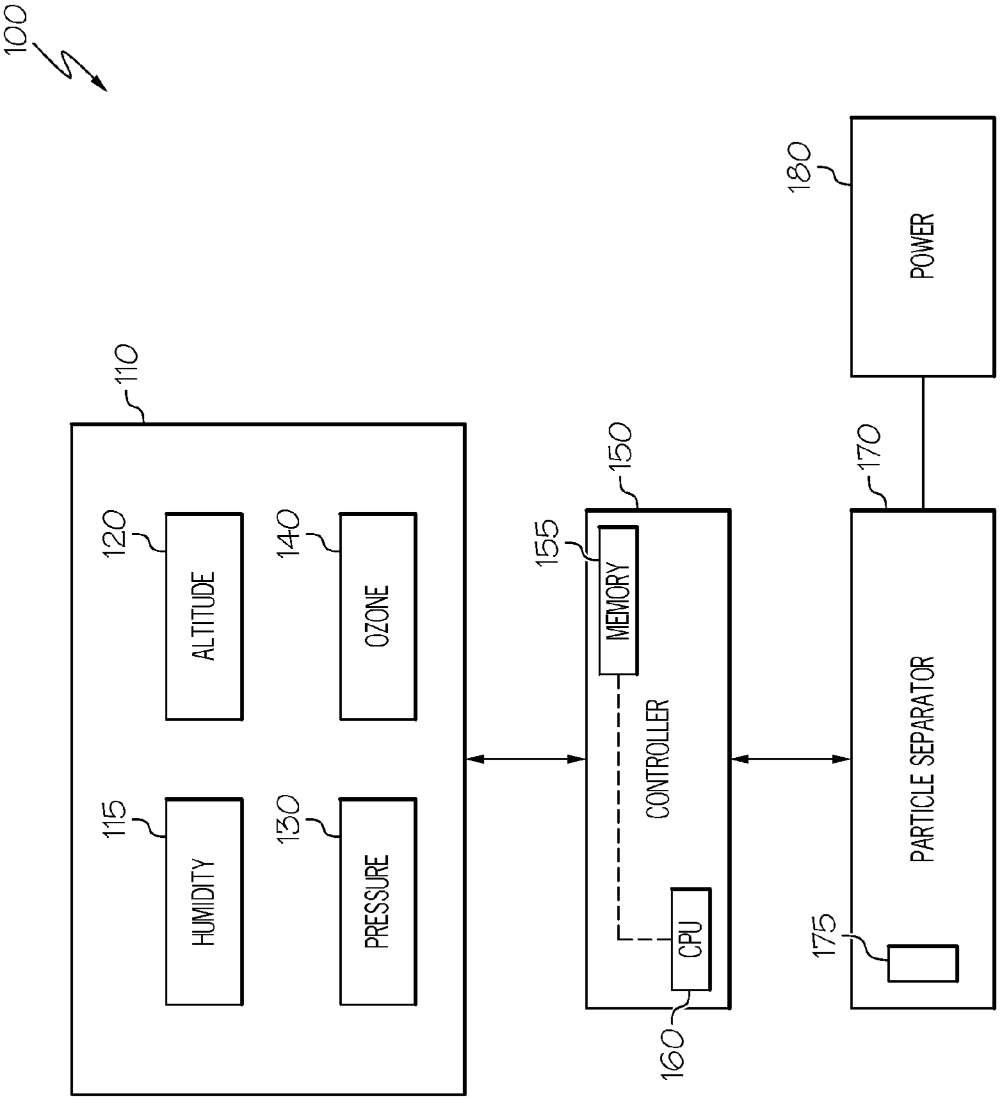
FIG. 2 is a block diagram of an electrostatic particle separation control system of FIG. 1 according to an exemplary embodiment of the present invention.

Referring now to FIG. 2, the electrostatic particle separation control system 100 is shown in more detail according to an exemplary embodiment of the present invention. The sensor module 110 may provide environmental parameters to the controller 150. The sensor module 110 may include, for example, a humidity sensor 115, an altimeter 120, an ambient pressure gauge 130, and an ozone meter 140. The sensor module 110 may provide measurement signals from the humidity sensor 115, the altimeter 120, the ambient pressure gauge 130, and the ozone meter 140 to the controller 150.

The controller 150 may include a memory module 155 and a processor 160. The memory module 155 may include stored non-transitory computer instructions for performing actions by the processor 160 on, for example, the particle separator 170. The memory module 155 may also store threshold values for various environmental conditions or parameters. For example, the memory module 155 may store a threshold altitude value, a threshold ambient pressure value, a threshold relative humidity value, and a threshold ozone level value. The memory module 155 may also store instructions for comparing any of the measurement signals from the sensor module 110 to the aforementioned threshold values and determining any actions as a result of the comparison(s).

In some embodiments, the particle separator 170 may include an inertial-based separator. The particle separator 170 may include an electrode 175 coupled to a high voltage power source 180. of the voltage source 180 may provide voltage ranging from 0-20,000 Vdc. The particle separator 170 may use the electrode 175 to charge liquid particles in an airstream and migrate the liquid particles away from the electrode 175 so they may be captured and separated from the airstream. As may be appreciated, a high voltage power source 180 may cause the electrode 175 to produce a corona effect in the airstream causing oxygen atoms to separate from their molecules, (for example water molecules) and reform as ozone molecules. The particle separator 170 may contribute ozone molecules to the environment (not shown) during operation. Thus, controlling operation of the particle separator 170 may control the amount of ozone content in the environment to minimize the presence of ozone where possible.

Figure 3:
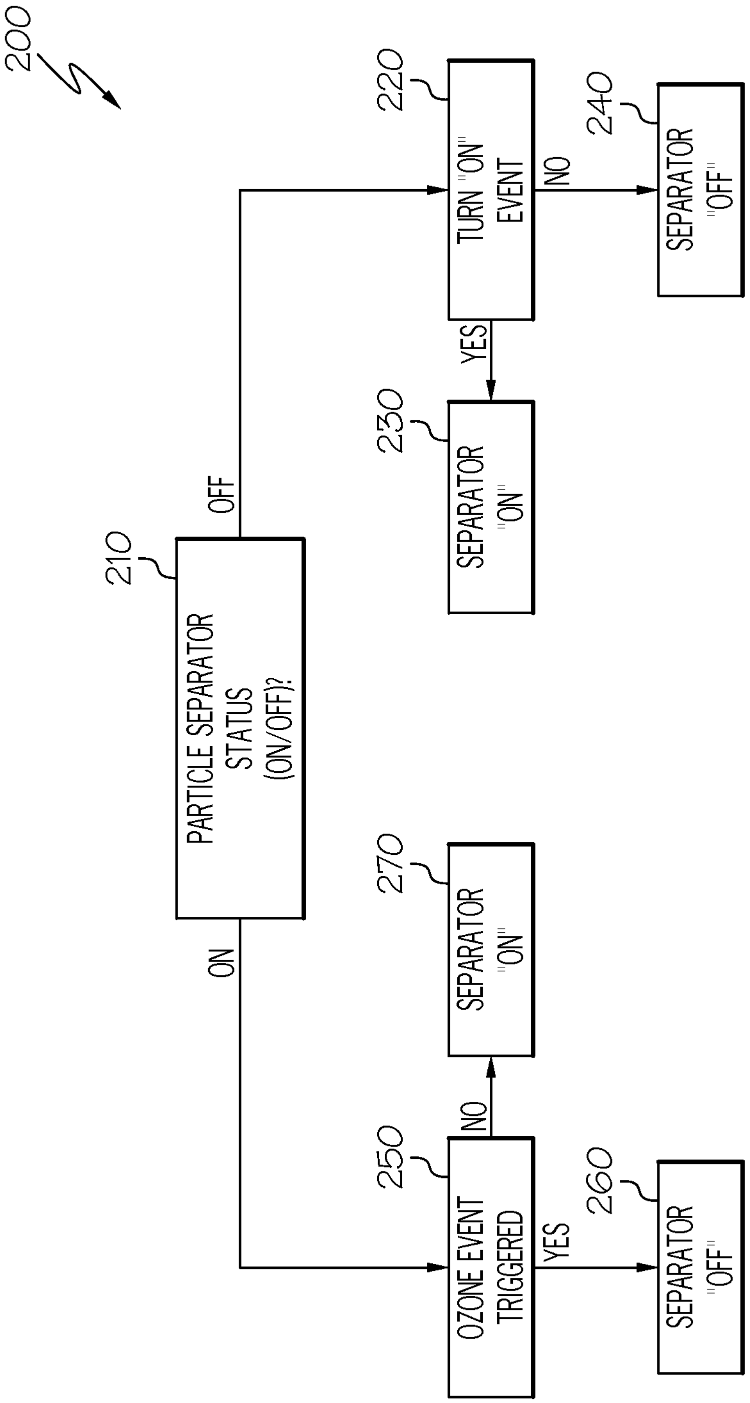
FIG. 3 is a flow chart of a method of operating a particle separator in an aircraft according to an exemplary embodiment of the present invention.

Referring now to FIG. 3, a method 200 of operating a particle separator in an environment is shown according to an exemplary embodiment of the present invention. In block 210, a processor may check the on/off status of the particle separator.

In the event, the particle separator is off, the processor may in block 220 check for parameters that may indicate that the particle separator should be turned on. Some exemplary conditions indicating a turn "on" event are described below in FIG. 4. If a turn "on" event is present, then the processor may switch the particle separator on in block 230. However, if the processor does not find that a turn "on" condition exists, then the particle separator may remain off in block 240.

In the event the particle separator is "on" in block 210, then the processor may in block 250 determine if an ozone related event in the environment is triggered. An ozone related event may be triggered when predetermined environmental conditions are detected. Ozone related events may be determined based on comparing measurement signals provided to the processor with stored threshold values. Exemplary ozone related conditions are described in further detail in FIG. 4. In block 260, if an ozone related event is detected, then the particle separator may be turned off. It may be appreciated that once the particle separator is turned off, any contribution to ozone production in the environment from charging particles in the particle separator may cease. In block 270, if an ozone related event is not detected, then the particle separator may remain turned on.

Figure 4:
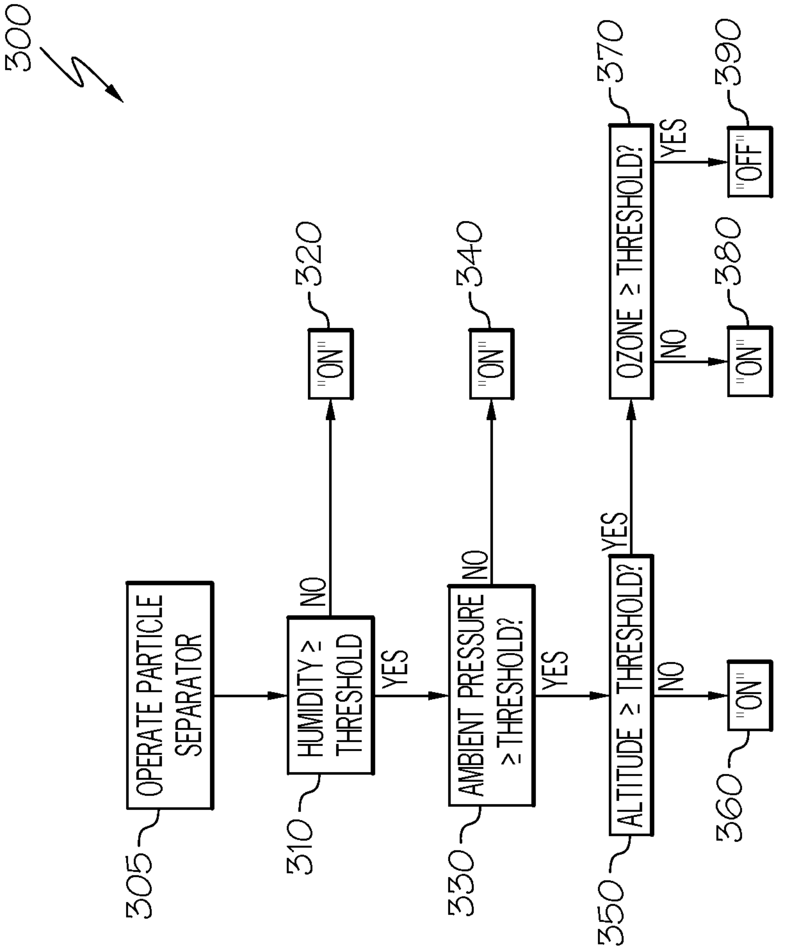
FIG. 4 is a flow chart of a method of controlling particle separation in an aircraft according to an exemplary embodiment of the present invention.

Referring now to FIG. 4, a method 300 of controlling ozone production in an environment is shown according to an exemplary embodiment of the present invention. In block 305, a controller may operate a particle separator and turn the particle separator on or off based on results of the following steps described in the blocks below. In block 310, the controller may compare a humidity measurement to a threshold humidity value. If the measurement does not indicate that the threshold humidity value is exceeded, then in block 320 the controller may place the particle separator in the off state.

If the measurement indicates that the threshold humidity value has been exceeded, then in block 330, the controller may compare an ambient pressure measurement to a threshold ambient pressure value. If the threshold ambient pressure value is not exceeded, then in block 340 the controller may place the particle separator in the off state. If the ambient pressure value is exceeded, then the controller may in block 350 compare if an altitude measurement exceeds a threshold altitude value. If the threshold altitude value is exceeded, then in block 360 the particle separator may be in the "on" state. If the threshold altitude value is not exceeded, then in block 370 the controller may compare an ozone measurement to a threshold ozone value. If the threshold ozone value is not exceeded, then in block 380 the particle separator may be in the "on" state. If the threshold ozone value is exceeded, then in block 390 the controller may place the particle separator in the off state.

Referring now to FIG. 5, a table showing altitude and corresponding saturation humidity and different locations (a reference standard, Location A, Location B, and Location C) is shown. In an exemplary embodiment of the present invention, a threshold altitude value may be stored for use in determining when the particle separator should be on or off. A default threshold altitude value, for example approximately 16,000 feet may be stored in the controller 150 (FIG. 1). However, the threshold altitude value may be changed according to the region the aircraft is travelling through. For example, in Location C the saturation humidity level at approximately 10,000 feet may be similar to the saturation humidity level at approximately 16,000 in Locations A and B. The saturation humidity level at Location C may drop off significantly above 10,000 feet and the aircraft may not necessarily need to separate liquid out of the aircraft's environment at this altitude. Thus, for flights around location C, the threshold altitude value may be set at approximately 10,000 feet.

It should be understood, of course, that the foregoing relates to exemplary embodiments of the invention and that modifications may be made without departing from the spirit and scope of the invention as set forth in the following claims.

We claim:

1. An electrostatic particle separation control system in an Environmental Control System (ECS), comprising:

a sensor module with a humidity sensor for sensing humidity and an ozone meter for sensing ozone level in an environment in which the system is positioned;

a particle separator with an electrode to charge liquid particles in an airstream so that the liquid particles migrate away from the electrode and are removed from the airstream;

a memory module with a stored threshold value for humidity level and a stored threshold value for ozone level and a default stored threshold altitude value for a corresponding saturation humidity level at a location and altitude of the ECS; and a controller configured to:

receive a sensed humidity level and sensed ozone level signals from the sensor module, and turn off the particle separator in response to the sensor module providing a signal indicating that the sensed humidity is below the saturation humidity level for the corresponding default threshold altitude value and sensed ozone level in said environment is at or above the stored threshold ozone level value.

2. The electrostatic particle separation control system of claim 1, wherein the sensor module includes an altimeter.

3. The electrostatic particle separation control system of claim 2, wherein the controller is configured to turn off the particle separator in response to the sensor module providing a signal indicating the ECS is above a threshold altitude.

4. The electrostatic particle separation control system of claim 1, wherein the sensor module includes an ambient pressure detector.

5. The electrostatic particle separation control system of claim 4, wherein the controller is configured to turn off the particle separator in response to the sensor module providing an ambient pressure signal below a threshold ambient pressure.

6. The electrostatic particle separation control system of claim 1, wherein the controller is configured to turn off the particle separator in response to the sensor module providing a humidity level signal below a threshold humidity level.

* * * * *